United States Patent [19]
Yonemitsu et al.

[11] Patent Number: 5,475,435
[45] Date of Patent: Dec. 12, 1995

[54] LAYER ENCODING APPARATUS AND LAYER DECODING APPARATUS FOR INPUT NON-INTERLACE VIDEO SIGNAL

[75] Inventors: Jun Yonemitsu; Katsumi Tahara, both of Kanagawa; Tomoyuki Sato, Tokyo, all of Japan

[73] Assignee: Sony Corporation, Japan

[21] Appl. No.: 145,325

[22] Filed: Oct. 28, 1993

[30] Foreign Application Priority Data

Nov. 2, 1992 [JP] Japan .................................. 4-294204

[51] Int. Cl.⁶ ...................................................... H04N 7/12
[52] U.S. Cl. ................................................ 348/426; 348/448
[58] Field of Search .................................. 348/426, 441, 348/448, 452, 458, 459; H04N 7/21, 7/12

[56] References Cited

U.S. PATENT DOCUMENTS 5,128,791  7/1992  LeGall et al. ............................ 348/426
5,337,154  8/1994  Dorricott et al. ....................... 348/448

OTHER PUBLICATIONS

Proposal for Test Model 2, Draft Revision 2, 19–Oct. 1992, pp. 37–46; 75–78; & 83–86.

*Primary Examiner*—Victor R. Kostak
*Attorney, Agent, or Firm*—Limbach & Limbach; Charles P. Sammut

[57] ABSTRACT

In an encoder, an input picture of a non-interlace structure is sampled by down sampling to form an interlace picture, and the interlace picture is encoded. The encoded data are decoded to form an interlace decoded picture, and the interlace decoded picture is sampled by up sampling and utilized as a predictive picture upon encoding of the non-interlace input picture. In a decoder, a bit stream corresponding to an interlace picture of a low resolution is decoded into an interlace decoded picture. The interlace decoded picture is sampled by up sampling and is utilized as a predictive picture upon decoding of a bit stream corresponding to a non-interlace picture of a high resolution.

16 Claims, 7 Drawing Sheets

1
LAYER ENCODING APPARATUS AND LAYER DECODING APPARATUS FOR INPUT NON-INTERLACE VIDEO SIGNAL

FIELD OF THE INVENTION

This invention relates to an encoding and/or decoding apparatus suitable for use with information recording and/or reproduction apparatus in which a storage type moving picture medium such as an optical disk or a magnetic tape is used and information transmission and/or reception apparatus such as television conference systems, moving picture telephone systems and broadcasting equipments.

BACKGROUND OF THE INVENTION

One of moving picture encoding and/or decoding systems wherein a spatial resolution between an input picture and an output picture is varied is a layer encoding/decoding system investigated in the ISO-IEC/JTC1/SC29/WG11. In the layer encoding/decoding system, basically on the encoder side, an input image of a low resolution is encoded in a lower layer to form a bit stream, and a decoded picture of the bit stream of the lower layer is converted by up conversion and used for encoding of an other input picture of an upper layer having a high resolution. On the other hand, on the decoder side, the decoded picture of the lower layer is converted by up conversion and used for decoding of a bit stream of the upper layer.

A detailed example of such layer encoding/decoding systems is disclosed in Proposal for Test Model 2, ISO-IEC/JTC1/SC29/WG11, revision 2, pp. 101–108, Oct. 19, 1992.

The layer encoding/decoding system, however, has a subject to be solved in that, since it is constructed so as to cope only with the case wherein the input is an interlace picture, it cannot cope with another case wherein the input is a non-interlace image.

OBJECT AND SUMMARY OF THE INVENTION

It is an object of the present invention to provide an encoding apparatus and a decoding apparatus which realize layer encoding and decoding of a non-interlace input image, respectively.

In according with the present invention, an interlace image is formed from an input non-interlace image. The interlace image is encoded to form a first encoded signal. A non-interlace image is formed from the first encoded signal. The input non-interlace image is encoded using the non-interlace image.

Further, in accordance with the present invention, a decoded interlace image is formed from a first input bit stream. A first decoded non-interlace image is formed from the decoded interlace image. A second decoded non-interlace image is formed from the first decoded non-interlace image and a second input bit stream.

The above and other objects, features and advantages of the present invention will be apparent from the following detailed description of the preferred embodiment when read in conjunction with the accompanying drawings in which like reference numerals are used to identify the same or similar parts in the several views.

DETAILED DESCRIPTION OF THE INVENTION

In the following, a system will be described wherein, for example, a non-interlace image is inputted and then decoded with the ratio of 2:1 between the numbers of scanning lines of an upper layer and a lower layer to obtain an output bit stream which has compatibility with both of a non-interlace image and an interlace image.

Figure 1:
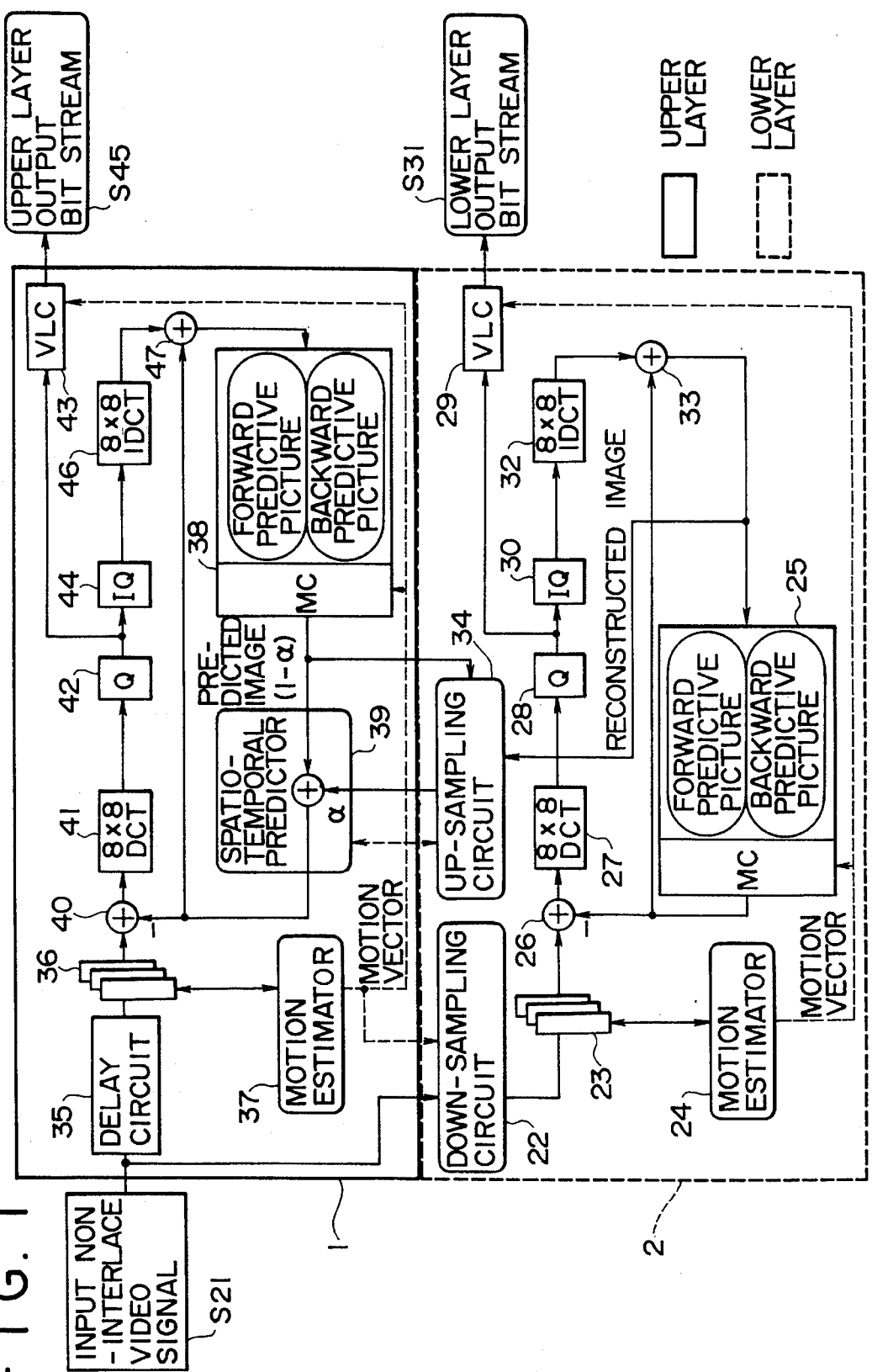
FIG. 1 is a block diagram showing the construction of an encoder wherein an upper layer has a non-interlace structure.

An encoding system or encoder according to the present invention will be described with reference to FIG. 1. First, a lower layer encoder block 2 will be described.

In the encoder, processing is performed in units of a macro block. An input video signal S21 of a high resolution having a non-interlace structure is inputted to a down sampling circuit 22, in which it is converted into an interlace image of a low resolution. Upon such conversion, a motion vector from a motion estimator 37 is referred to to adaptively determine whether or not the input video signal S21 should be passed through a low-pass filter upon sampling of the data. Here, the motion vector may be supplied from a motion estimator 24 which will be hereinafter described. In this instance, however, since a motion vector of an image a little prior in time is used, the encoding efficiency on the upper layer side sometimes exhibits a rather low level. Details of the down sampling circuit 22 will be hereinafter described.

An interlace picture of a block format sampled by down sampling by the down sampling circuit 22 is stored into a frame memory set 23 and used for detection of a motion vector by the motion estimator 24. The motion estimator 24 detects a motion vector from a reference picture at present using a forward predictive picture and a backward predictive picture from among pictures stored in the frame memory set 23. Here, in detection of a motion vector, one of motion vectors with which the absolute value sum of differences between fields or frames in units of a block is determined as a motion vector.

Information of the motion vector is transmitted to a motion compensation frame memory set 25, in which selection of a macro block type is formed. Then, a predictive picture corresponding to the thus selected macro block type is sent to a difference unit 26. The difference unit 26 calculates a difference between the input picture and the predictive picture and outputs the difference to a discrete cosine transform (DCT) circuit 27.

The DCT circuit 27 transforms the input picture data or the difference data in units of a block by discrete cosine transform making use of a two-dimensional correlation of a video signal and outputs transform data obtained by the discrete cosine transform to a quantization circuit 28.

The quantization circuit 28 quantizes the DCT transform data with a quantization step size, which is determined for each macro block or slice, and supplies quantization data obtained at an output terminal thereof as a result of the quantization to a variable length coding (VLC) circuit 29 and a dequantization circuit 30.

The VLC circuit 29 processes the quantization data by variable length coding processing together with the quantization scale, the macro block type, the motion vector and so forth and outputs a lower layer bit stream S31 obtained by the variable length coding as transmission data.

The dequantization circuit 30 dequantizes the quantization data sent out from the quantization circuit 28 into dequantization data and decodes the transform data of the output data before the transformation by the quantization circuit. Then, the dequantization circuit 30 supplies the dequantization data to an inverse discrete cosine transform (IDCT) circuit 32.

The IDCT circuit 32 transforms the dequantization data decoded by the dequantization circuit 30 back into decoded picture data by inverse transform processing to that of the DCT circuit and outputs the decoded picture data to the motion compensation frame memory set 25.

The motion compensation frame memory set 25 performs motion compensation based on the motion vector supplied thereto from the motion estimator 24 and writes the decoded picture as a forward predictive picture or a backward predictive picture into the frame memories. In the case of forward, backward or bidirectional prediction, the difference from the predictive picture is transmitted as an output of the IDCT circuit 32 to the motion compensation frame memory set 25, and accordingly, local decoding is performed by adding the difference to the predictive picture using an adder 33.

The predictive picture here is identical with the picture decoded by the lower layer decoder, and forward, backward or bidirectional prediction is performed for a picture for next processing based on the predictive picture.

The locally decoded picture outputted from the adder 33 is supplied also to an up sampling circuit 34. While the locally decoded picture of the lower layer has an interlace structure, interpolation is performed for the locally decoded picture by the up sampling circuit 34 so that the locally decoded picture is converted into a non-interlace picture similarly to that of the upper layer, and the non-interlace picture is inputted to a spatio-temporal predictor 39 of the upper layer.

The up sampling circuit 34 adaptively refers to both of a picture from the upper layer which includes same spatial sample points with a full degree of accuracy but are different in temporal sample points and another picture from the lower layer which has a lower resolution due to sampling but has same temporal sampling points based on the motion information to produce a non-interlace interpolation picture. Details of the up sampling circuit 34 will be hereinafter described.

Subsequently, the construction of the upper layer will be described. In the upper layer encoder block 1, the input non-interlace video signal S21 is processed while remaining in the full degree of accuracy. The input non-interlace video signal S21 is delayed by a delay circuit 35 and then stored into a frame memory 36, whereafter detection of a motion vector is performed for the input non-interlace video signal S21 by a motion estimator 37. The motion estimator 37 operates similarly to the motion estimator 34.

The information of the motion vector is sent to a motion compensation frame memory set 38, and a corresponding predictive picture is inputted to a spatio-temporal predictor 39. The spatio-temporal predictor 39 adaptively selects, by weighting, the predictive picture from the motion compensation frame memory set 38, that is, a predictive picture from the temporal direction, and the predictive picture from the up sampling circuit 34, that is, another predictive picture from the spatial direction.

The spatio-temporal predictor 39 determines a coefficient $\alpha$ based on the motion information from the motion estimator 37, applies weighting of $1-\alpha$ to the predictive picture in the temporal direction, that is, the predictive picture of the upper layer and applies weighting of $\alpha$ to the predictive picture in the spatial direction, that is, the predictive picture from the lower layer, and then sends the thus weighted predictive pictures to a cumulative difference unit 40.

The difference unit 40 calculates a difference between the input picture and the predictive pictures and outputs the difference to a discrete cosine transform circuit (DCT) 41.

The DCT circuit 41 transforms the input picture data or the difference data by discrete cosine transform making use of a two-dimensional correction of a video signal and outputs transform data obtained by the discrete cosine transform to a quantization circuit 42.

The quantization circuit 42 quantizes the DCT transform data with a quantization step size, which is determined for each macro block or slice, and supplies quantization data obtained at an output terminal thereof as a result of the quantization to a variable length coding (VLC) circuit 43 and a dequantization circuit 44.

The VLC circuit 43 processes the quantization data by variable length coding processing together with the quantization scale, the macro block type, the motion vector and so forth and outputs an upper layer bit stream S45 obtained by the variable length coding as transmission data.

The quantization circuit 44 quantizes the quantization data sent out from the quantization circuit 42 into a representative value to obtain dequantization data and decodes the transform data back of the output data before the transformation by the quantization circuit 42. Then, the dequantization circuit 44 supplies the dequantization data to an inverse discrete cosine transform (IDCT) circuit 46.

The IDCT circuit 46 transforms the dequantization data decoded by the dequantization circuit 44 back into decoded picture data by inverse transform processing to that of the DCT circuit 41 and outputs the decoded picture data to the motion compensation frame memory set 38.

The motion compensation frame memory set 38 performs local decoding based on the motion vector supplied thereto from the motion estimator 24, the macro block type and the motion vector, and writes the locally decoded picture as a forward predictive picture or a backward predictive picture into the frame memories. In the case of forward or bidirectional prediction, the difference from the predictive picture is transmitted as an output of the IDCT circuit 46 to the motion compensation frame memory set 38, and accordingly, local decoding is performed by adding the difference to the predictive picture using an adder 47.

The predictive picture here is identical with the picture decoded by the upper layer decoder, and forward or bidirectional prediction is performed for a picture for next processing based on the predictive picture.

Figure 3:
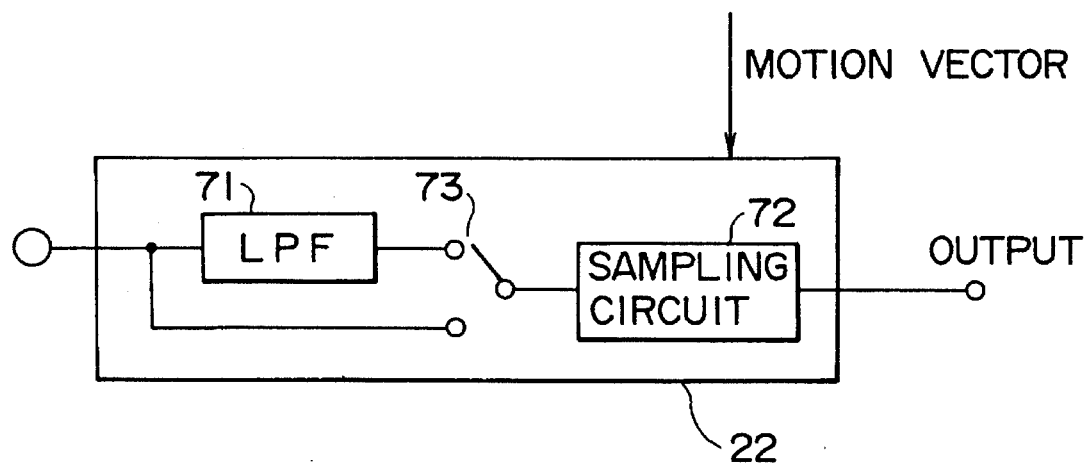
FIG. 3 is a diagrammatic view showing the construction of a down sampling circuit.

FIG. 3 shows the construction of the down sampling circuit 22. An input picture is inputted to a low-pass filter 71, and a switch 73 adaptively selects the input picture or the output picture of the low-pass filter 71 in response to a motion vector. The output of the switch 73 is alternately sampled by a sampling circuit 72. Since the picture after such sampling includes reflected components, normally it is acted upon uniformly by the low-pass filter 71, but due to the characteristic that the input is a non-interlace video signal, when the motion is small, sample points which are identical in spatial positions with but different in temporal positions from thinned out points are present without fail.

Figure 4:
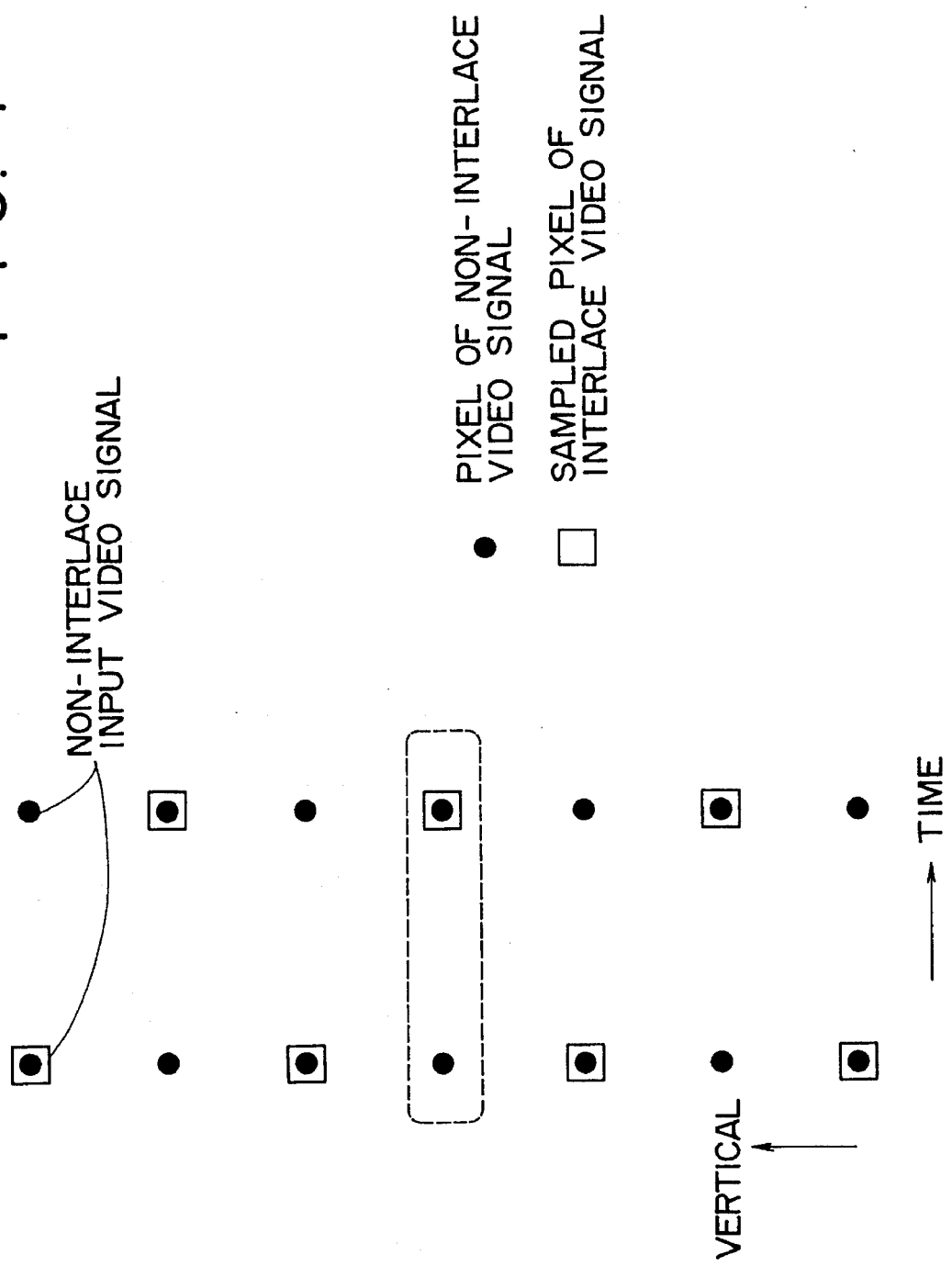
FIG. 4 is a diagrammatic representation illustrating down sampling operation.

FIG. 4 illustrates operation of the down sampling circuit 22. Referring to FIG. 4, two columns of dots respectively indicate the positions of pixels arranged in the vertical direction in a single picture. The down sampling circuit 22 thins out those pixels at alternate positions from two pictures while sampling only those pixels surrounded by squares in FIG. 4 to convert the input non-interlace video signal into an interlace picture. In the case of, for example, a still picture, the two points surrounded by a dotted line in FIG. 4 represent identical data, and accordingly, filtering processing is unnecessary as described above.

Figure 5:
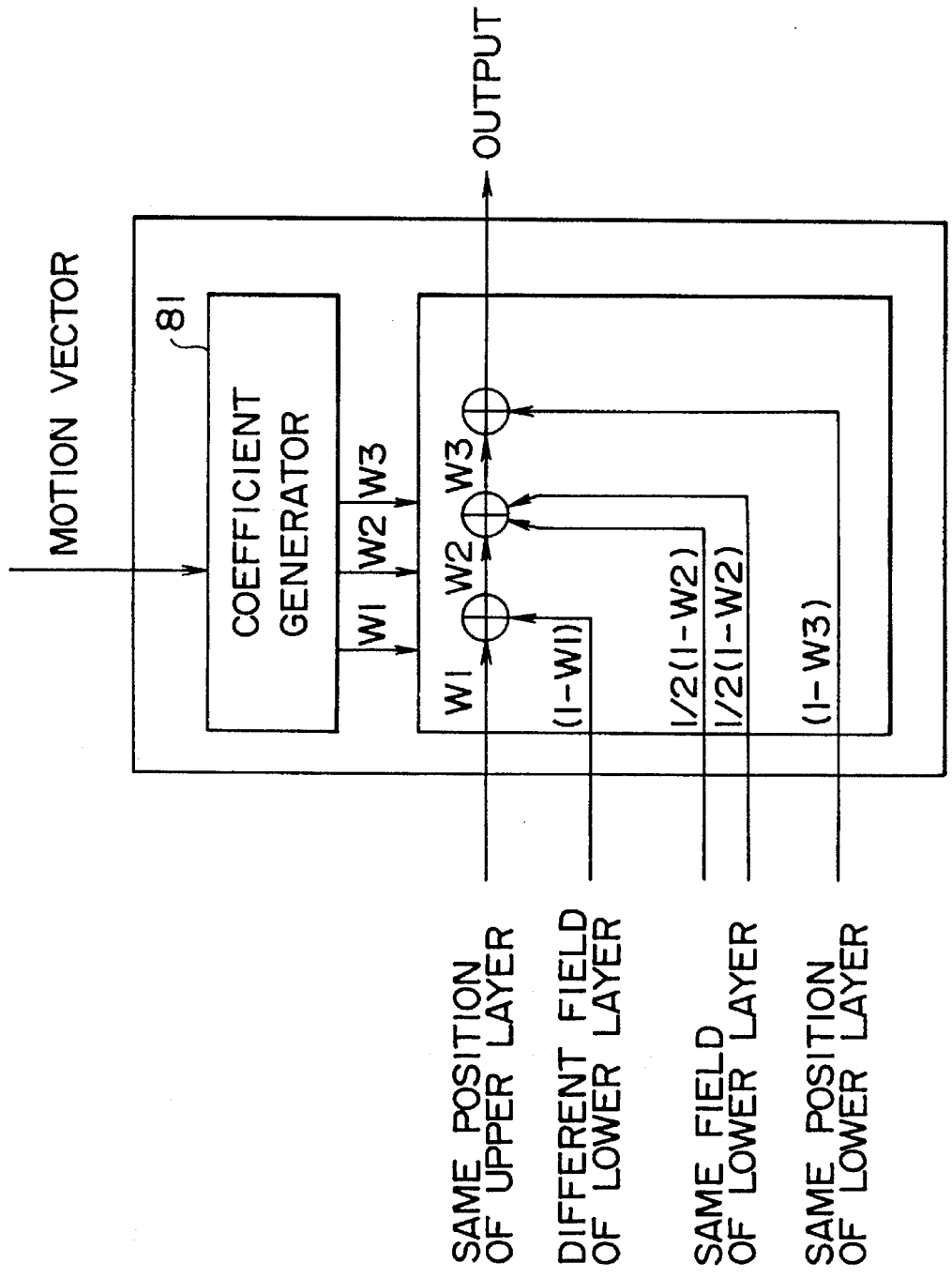
FIG. 5 is a diagrammatic view showing the construction of an up sampling circuit.

FIG. 5 shows the construction of the up sampling circuit 34. The input to the up sampling circuit 34 includes data of the upper layer which are at the same spatial positions but are at different temporal positions, data interpolated from sample points of the same field of the lower layer, and data at the corresponding points from a different field of the lower layer. Weighting interpolation is thus performed for the inputs using coefficients w1, w2 and w3 which are adaptively determined by a coefficient generator 81.

Figure 6:
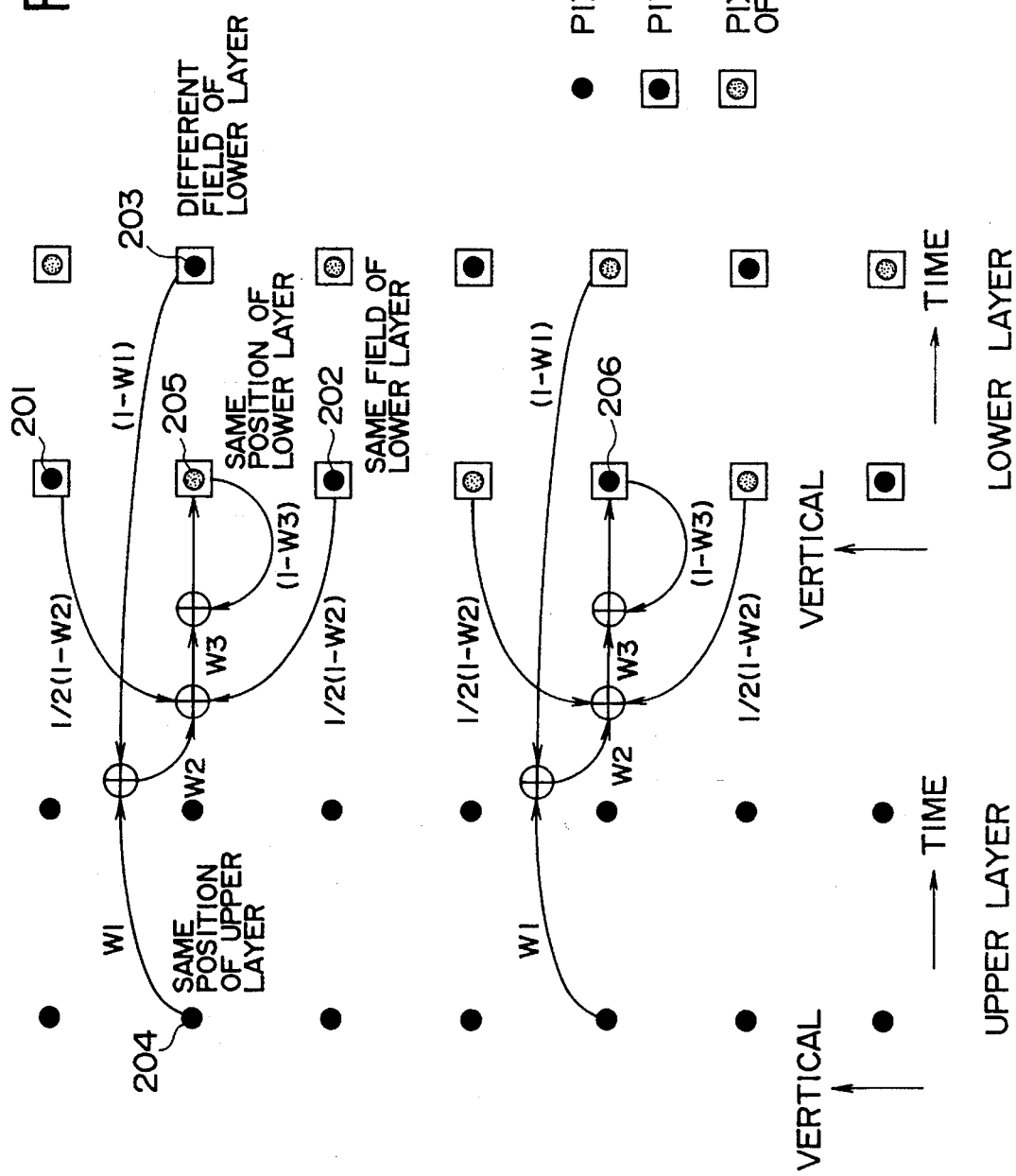
FIG. 6 is a diagrammatic representation illustrating up sampling operation.

FIG. 6 illustrates operation of the up sampling circuit 34. Referring to FIG. 6, two left side columns of dots respectively indicate the positions of pixels arranged in a vertical direction in a single picture of the upper layer. Meanwhile, the other two right side columns of dots respectively indicate the positions of pixels arranged in a vertical direction in a single picture of the lower layer. As seen from FIG. 6, the up sampling circuit 34 performs, for a pixel for which interpolation should be performed, interpolation from adjacent pixels in the same field of the lower layer and weighting interpolation from a pixel of the other field of the lower layer and another pixel at the same spatial position of the upper layer using the coefficients of w1 and w2, respectively. Further, the up sampling circuit 34 adds the interpolation values obtained using the coefficients of w1 and w2 and the value at the same position of the lower layer, that is, the value of the point for which interpolation should be performed, with the weight of the coefficient of w3. For example, when the pixel for which interpolation should be performed is at the position of 205, the up sampling circuit 34 performs interpolation from the adjacent pixels 201 and 202 in the same field of the lower layer and weighted interpolation from the pixel 203 at the same position in the other field of the lower layer and the pixel 204 at the same spatial position of the upper layer using the coefficients of w1 and w2. In this instance, the pixel 205 at the same position of the lower layer referred to with the coefficient of 1−w3 is a point for which interpolation of zero has been performed, and since the value is 0, it does not have an influence upon the interpolation. On the other hand, when the pixel for which interpolation should be performed is at the position of 206, that is, when the pixel 206 of the lower layer which is not equal to zero is present at the same position for which interpolation should be performed, since the points referred to with the coefficients of 1−w1 and 1−w2 are points for which interpolation of zero has been performed, they have no influence upon the interpolation. Both when the pixel for which interpolation should be performed is at the position of 205 and when the pixel for which interpolation should be performed is at the position of 206, a similar circuit configuration is employed for the processing.

If the coefficient w1 is set to 0 upon interpolation, then a value at the point for which interpolation should be performed can be produced using values only in the lower layer without using any value in the upper layer. Further, the down sampling circuit 22 and the up sampling circuit 34 can be adapted to conversion of a resolution at some other ratio than sampling or interpolation of 2:1 by suitably selecting an interpolation filter and sample points.

Figure 7:
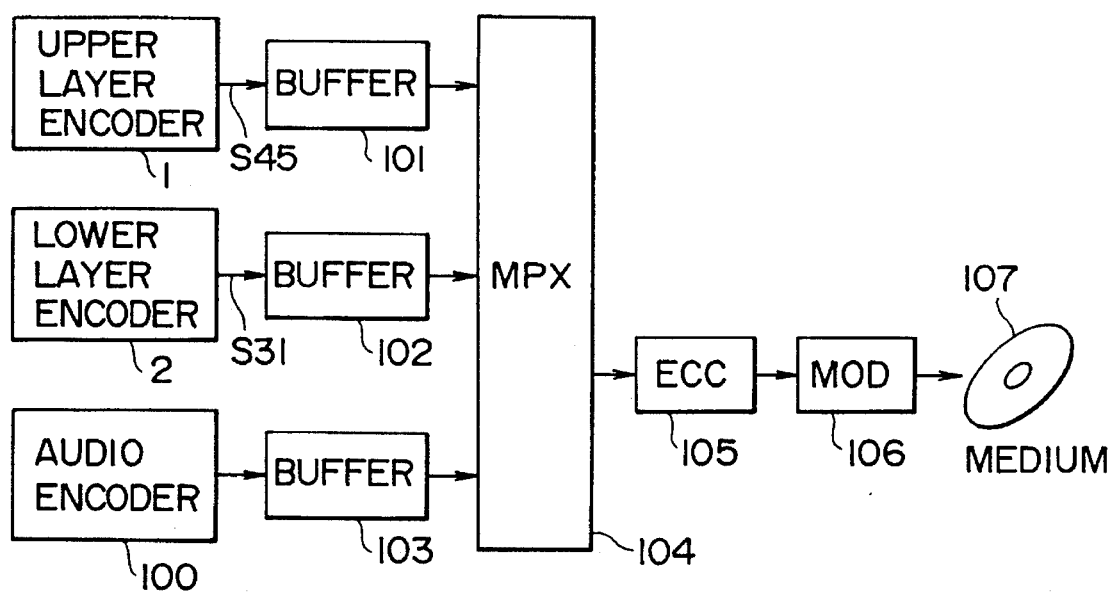
FIG. 7 is a block diagram showing an apparatus for recording a bit stream.

FIG. 7 shows an example of a recording apparatus for a lower layer bit stream and an upper layer bit stream. Referring to FIG. 7, an upper layer bit stream S45 outputted from the upper layer encoder 1 and a lower layer bit stream S31 outputted from the lower layer encoder 2 are multiplexed, after passing buffers 101 and 102, respectively, by a multiplexing circuit 104 with an audio signal, which has been encoded by an audio encoder 100 and passed through a buffer 103, and a synchronizing signal not shown. A multiplexed bit stream outputted from the multiplexing circuit 104 is processed by addition processing of a code for error correction by an error correction code addition circuit 105, and then processed by predetermined modulation by a modulator 106, whereafter it is recorded as concave and convex pits on a master disk 107 by means of a laser beam. A stamper is formed making use of the master disk 107, and a large number of copy disks, such as, for example, optical disks, are formed using the stamper.

Figure 2:
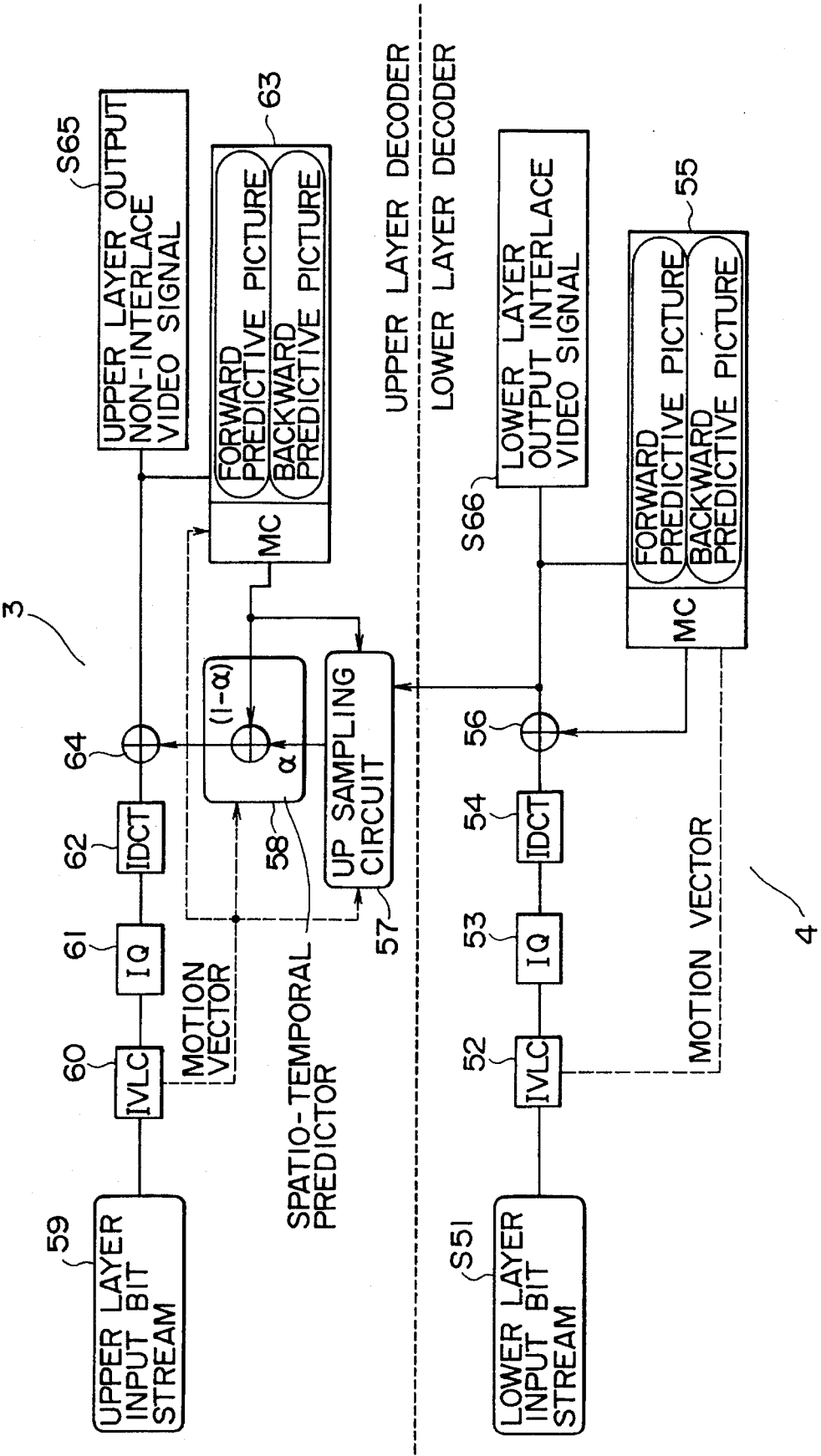
FIG. 2 is a block diagram showing the construction of a decoder wherein an upper layer has a non-interlace structure.

Subsequently, the decoding system (decoder) of the present invention will be described with reference to FIG. 2. First, a lower layer decoder block 4 will be described. A lower layer bit stream S51 is inputted to the decoder of the lower layer by way of a transmission medium such as an optical disk. The bit stream S51 is inputted to a variable length decoding (IVLC) circuit 52. The variable length decoding circuit 52 decodes the bit stream S51 and outputs quantization data, a motion vector, a macro block type, a predictive mode, a quantization scale and so forth.

A dequantization circuit 53 dequantizes the quantization data outputted from the variable length decoding circuit 52 into a representative value based on the quantization scale to obtain dequantization data and decodes the transform data before the transformation by the quantization circuit of the encoder. Then, the dequantization circuit 53 supplies the dequantization data to an inverse discrete cosine transform (IDCT) circuit 54.

The IDCT circuit 54 transforms the dequantization data decoded by the dequantization circuit 53 back into decoded picture data by inverse transform processing to that of the DCT circuit 27 and outputs the decoded picture data to a motion compensation frame memory set 55. Further, the decoded picture data having an interlace structure is simultaneously outputted as a lower layer output to an up sampling circuit 57.

The motion compensation frame memory set 55 performs decoding based on the output data of the IDCT circuit 54, the macroblock type and the motion vector and writes the decoded picture as a forward predictive picture or a backward predictive picture into the frame memories. In the case of forward, backward or bidirectional prediction, a difference from a predictive picture is transmitted as the output of the IDCT circuit 54 to the motion compensation frame memory set 55, and accordingly, decoding is performed by adding the difference to the predictive picture using an adder 56 to form a lower layer picture S66 having an interlace structure as a decoded picture.

The predictive picture here is identical with the picture decoded by the local decoder of the encoder, and forward, backward or bidirectional prediction is performed for a picture for next processing based on the predictive picture.

Simultaneously, the output picture S66 of the lower layer is inputted to the up sampling circuit 57, in which it is processed by interpolation so that it is converted into a non-interlace picture. The non-interlace picture is inputted to a spatio-temporal predictor 58.

The up sampling circuit 47 operates similarly to the up sampling circuit 34 described hereinabove in connection with the encoder.

Subsequently, the upper layer will be described. An upper layer input bit stream 59 is inputted to the upper layer. The bit stream 59 is inputted to a variable length decoding (IVLC) circuit 60. The variable length decoding circuit 60 decodes the bit stream 59 and outputs quantization data, a motion vector, a macroblock type and a quantization scale.

A dequantization circuit 61 dequantizes the quantization data outputted from the variable length decoding circuit 60 into a representative value based on the quantization scale to obtain dequantization data and decodes the transform data before the transformation by the quantization circuit of the encoder. Then, the dequantization circuit 61 supplies the dequantization data to an inverse discrete cosine transform (IDCT) circuit 62.

The IDCT circuit 62 transforms the dequantization data decoded by the dequantization circuit 61 back into decoded picture data by inverse transform processing to that of the DCT circuit 41 and outputs the decoded picture data to a motion compensation frame memory set 63. Further, the decoded picture data having an interlace structure is simultaneously outputted as an upper layer output picture S65 having a non-interlace structure.

The motion compensation frame memory set 63 performs decoding based on the output data of the IDCT circuit 62, the macro block type and the motion vector and writes the decoded picture as a forward predictive picture or a backward predictive picture into the frame memories.

The picture corresponding to the selected macro block type is inputted to the spatio-temporal predictor 58. The spatio-temporal predictor 58 operates similarly to the spatio-temporal predictor 39 of FIG. 1 in the encoder described hereinabove.

In particular, a picture obtained by adaptively weighting a predictive picture of the upper layer which has a spatially high resolution but is different in temporal sample points and another predictive picture of the lower layer which may possibly be inferior in spatial resolution but is same in temporal sample points is outputted from the spatio-temporal predictor 58. In the case of forward, backward or bidirectional prediction, since the difference from the predictive picture is transmitted as the output of the IDCT circuit 61, decoding is performed by adding the difference to the predictive picture using an adder 64.

As described so far, both of the output of a non-interlace picture and the output of an interlace picture can be obtained from an upper layer input bit stream and a lower layer output bit stream.

It is to be noted that, while, in the embodiment described above, a bit stream outputted from the encoder is recorded onto an optical disk, it may otherwise be sent out into a transmission line for the ISDN or the communications by satellites.

While a specific embodiment of the invention has been shown and disclosed, it is to be understood that numerous changes and modifications may be made by those skilled in the art without departing from the scope and intent of the invention.

What is claimed is:

1. A video signal encoding apparatus, comprising:

down sampling means for sampling a non-interlace input video signal by down sampling to form an interlace signal;

first encoding means for encoding the interlace signal to form a first bit stream;

up sampling means for sampling the video signal based on the first bit stream by up sampling to form a non-interlace signal; and second encoding means for encoding the non-interlace input video signal using the non-interlace signal, wherein said first encoding means includes first conversion means for performing predetermined conversion of the interlace signal, and first local decoding means for locally decoding the output of said first conversion means to form a first locally decoded signal, said up sampling means sampling the first locally decoded signal by up sampling to form the non-interlace signal.

2. A video signal encoding apparatus according to claim 1, wherein said second encoding means includes second conversion means for performing predetermined conversion of the non-interlace input signal, second local decoding means for locally decoding the output of said second conversion means to form a second locally decoded signal, motion compensation means for performing motion compensation of the second locally decoded signal to form a first predictive signal, and predictive signal formation means for forming a second predictive signal based on the non-interlace signal outputted from said up sampling means and the first predictive signal.

3. A video signal encoding apparatus according to claim 1, wherein said down sampling means includes thinning out means for thinning out pixels of the non-interlace input video signal, and filter means for changing over presence or absence of filtering to the input to said thinning out means in response to motion information.

4. A video signal encoding apparatus according to claim 2, wherein said up sampling means includes interpolation means for performing interpolation based on pixels of the first predictive signal at the same positions and/or pixels of the first locally decoded signal at the same positions of an adjacent field.

5. A video signal encoding apparatus according to claim 4, wherein said interpolation means includes coefficient generation means for generating a predetermined coefficient in response to motion information.

6. A video signal decoding apparatus, comprising:

first decoding means for forming an interlace decoded signal from a first input bit stream;

up sampling means for sampling the interlace decoded signal by up sampling to form a first non-interlace decoded signal;

second decoding means for forming a second non-interlace decoded signal from a second bit stream;

motion compensation means for performing motion compensation of the second non-interlace decoded signal to form a first predictive signal; and predictive picture formation means for forming a second predictive signal for decoding the second non-interlace decoded signal based on the first non-interlace decoded signal and the first predictive signal.

7. A video signal decoding apparatus according to claim 6, wherein said up sampling means includes interpolation means for performing interpolation based on pixels of the first predictive signal at the same positions and/or pixels of the first locally decoded signal at the same positions of an adjacent field.

8. A video signal decoding apparatus according to claim 7, wherein said interpolation means includes coefficient generation means for generating a predetermined coefficient based on motion information.

9. A video signal encoding method, comprising the step of:

sampling a non-interlace input video signal by down sampling to form an interlace signal;

encoding the interlace signal to form a first bit stream;

sampling a signal based on the first bit stream by up sampling to form a non-interlace signal; and encoding the non-interlace input video signal using the non-interlace signal, wherein the step of encoding the interlace signal includes the steps of performing predetermined conversion of the interlace signal to form first coefficient data and locally decoding the coefficient data to form a first locally decoded signal, the signal based on the first bit stream being the first locally decoded signal.

10. A video signal encoding method according to claim 9, wherein the step of encoding the non-interlace input signal includes the steps of performing predetermined conversion of the non-interlace input signal to form second coefficient data, locally decoding the second coefficient data to form a second locally decoded signal, performing motion compensation of the second locally decoded signal to form a first predictive signal, and forming a second predictive signal based on the non-interlace signal and the first predictive signal.

11. A video signal encoding method according to claim 9, wherein, upon the down sampling, presence or absence of filtering is changed over in response to motion compensation.

12. A video signal encoding method according to claim 10, wherein, upon the up sampling, interpolation is performed based on signal elements of the first predictive signal at the same positions and/or pixels of the first locally decoded signal at the same positions of an adjacent field.

13. A video signal encoding method according to claim 12, wherein the step of interpolation includes the step of performing predetermined weighting of pixels of the first predictive signal at the same positions and/or pixels of the first locally decoded signal at the same positions of an adjacent field in response to motion information.

14. A video signal decoding method, comprising the steps of:

forming an interlace decoded signal from a first input bit stream;

sampling the interlace decoded signal by up sampling to form a first non-interlace decoded signal;

forming a second non-interlace decoded signal from a second bit stream;

performing motion compensation of the second non-interlace decoded signal to form a first predictive signal; and forming a second predictive signal for decoding the second non-interlace decoded signal based on the first interlace decoded signal and the first predictive signal.

15. A video signal decoding method according to claim 14, wherein, upon the up sampling, interpolation is performed based on pixels of the first predictive signal at the same positions and/or pixels of the first locally decoded signal at the same positions of an adjacent field.

16. A video signal decoding method according to claim 15, wherein the step of interpolation includes the step of performing predetermined weighting of pixels of the first predictive signal at the same positions and/or pixels of the first locally decoded signal at the same positions of an adjacent field.

* * * * *